United States Patent [19]

Arase et al.

[11] Patent Number: 5,219,627
[45] Date of Patent: Jun. 15, 1993

[54] SURFACE-ROUGHENED ROLLED PLATE-SHAPED BODY CONTAINING CONVERGING PIGMENT

[75] Inventors: Susumu Arase; Junichiro Yokota; Hiroshi Takasu, all of Chiba, Japan

[73] Assignee: Chisso Corporation, Osaka, Japan

[21] Appl. No.: 682,457

[22] Filed: Apr. 9, 1991

[30] Foreign Application Priority Data

Apr. 12, 1990 [JP] Japan ................................ 2-95077

[51] Int. Cl.$^5$ .......................... B29D 22/00; B31F 1/22
[52] U.S. Cl. ................................ 428/35.7; 428/36.92; 428/143; 428/156; 428/212; 428/213; 428/474.4; 428/521; 264/503; 264/175; 264/177.2; 264/210.5; 264/293; 264/299; 264/310; 156/196; 156/209; 220/574
[58] Field of Search ............... 428/141, 156, 143, 212, 428/213, 35.7, 36.92, 129, 323, 409, 474.4, 521; 156/196, 199, 209; 220/524; 264/500, 503, 531, 145, 175, 177.2, 210.5, 293, 299, 310, 661

[56] References Cited

FOREIGN PATENT DOCUMENTS 0041274 12/1981 European Pat. Off. ............... 11/06
0308205 3/1989 European Pat. Off. ............... 59/04
2-167723 6/1990 Japan .

OTHER PUBLICATIONS

Patent Abstr. of Japan, vol. 7, No. 156, "Color Polarizing Plate"; p. 209, Jul. 8, 1983.
Patent Abstr. of Japan, vol. 7, No. 203, "Manufacture of Synthetic Resin Sheet with Transparent Part"; p. 241, Sep. 8, 1993.
Patent Abstr. of Japan, vol. 10, No. 295, "Polyethylene Sheet with Ground Design"; p. 523, Oct. 7, 1986.
WPIL; Week 8349; JP-A-58 185 224 "Manufacture Polypropyl Sheet Pack Tablet Extrude Orient Polypropylene . . . Sheet".

*Primary Examiner*—Donald J. Loney
*Attorney, Agent, or Firm*—Leydig, Voit & Mayer

[57] ABSTRACT

A one-side-roughened rolled plate-like or plate-shaped body containing a converging pigment comprises a plate-like body formed from a resin composition which comprises a crystalline thermoplastic resin and a converging pigment in an amount ranging from 0.001 to 0.5 part by weight per 100 parts by weight of the resin, wherein one of the sides thereof is smooth and the other side thereof is roughened and wherein the overall haze thereof is not less than 50% and the internal haze thereof is not more than 10%. The rolled plate-like body can be prepared by rolling the foregoing plate-like body at a temperature of not more than the melting point of the resin and a thickness reduction of not less than 40% and then surface-roughening the body simultaneously with or after the rolling treatment. The rolled plate-like body can be made partially transparent upon using the same and thus makes it possible to display the color of the converging pigment clearly and brilliantly at the edge of the transparent region. Therefore, it is useful in wide variety of fields such as containers, packaging materials and character goods.

19 Claims, No Drawings

SURFACE-ROUGHENED ROLLED PLATE-SHAPED BODY CONTAINING CONVERGING PIGMENT

BACKGROUND OF THE INVENTION

1. Field of the Invention

The present invention relates to a rolled plate-like or plate-shaped body (hereinafter plate-like body refers to plates, sheets or films) pigmented with a converging pigment which comprises a crystalline thermoplastic resin, has a high tensile strength and can be made partially transparent and in which the color of the converging pigment can be seen clearly and brilliantly at the edge portion of a region thereof which is made transparent, while it is opaque at the roughened face side as well. The present invention also relates to a method for preparing such rolled plate-shaped bodies.

2. Description of the Prior Art

Converging pigments have conventionally been used by incorporating them into resins which have high transparency, but are amorphous in nature, such as polycarbonate, polystyrene, poly(methyl methacrylate) and polyvinyl chloride. However, these resins are amorphous and accordinqly, the molded products such as films and sheets produced from the resins do not show high tensile strength. The tensile strength thereof is at highest on the order of 3 to 8 kgf/mm². On the other hand, the crystalline thermoplastic resins can provide molded products having a high tensile strength. However, crystalline regions and amorphous regions in general coexist in these crystalline resins although they are, as a rule, called crystalline polymers and correspondingly the densities and the refractive indices of these regions are different from one another. More specifically, they have a multimolecular structure from the optical viewpoint and, therefore, a large quantity of light is scattered within the sheet or film and thus the converging pigment cannot sufficiently show its effect. Since there has not yet been developed any means for solving the problem, it is difficult to uniformly incorporate any converging pigment into the crystalline thermoplastic resins.

Under such circumstances, the inventors of this invention have already found out that if a sheet or a film of a crystalline thermoplastic resin is subjected to a rolling treatment, the tensile strength of the crystalline thermoplastic resins can be substantially improved, further the crystal grains present therein are broken and as a result, the quantity of light diffused within the sheets of the crystalline thermoplastic resin can be reduced (in other words, the transparency of the sheet can be enhanced) and that under such a condition, a converging pigment can show its function sufficiently even in the crystalline thermoplastic resins. This technique was already disclosed in Japanese Patent Application laid-open No. Hei 2-167723.

However, there has sometimes been desired, depending on the applications, a plate-like body which is as a whole opaque and whose any desired portion can be locally made transparent according to need and which makes it possible to clearly and brilliantly observe the color of a converging pigment through the edge of the transparent portion.

SUMMARY OF THE INVENTION

The inventors of this invention have conducted intensive studies to develop a rolled plate-like body containing a converging pigment which can locally be made transparent at any desired portion thereof so that the color of the pigment can clearly and brilliantly be seen at the edge of the transparent portion thereof and thus have completed the present invention. Accordingly, the present invention relates to a one-side-roughened rolled plate-like body which comprises a plate-like body formed from a resin composition comprising a crystalline thermoplastic resin and a converging pigment in an amount ranging from 0.001 to 0.5 part by weight per 100 parts by weight of the resin, wherein one of the sides thereof is smooth and the other side thereof is roughened and wherein the overall haze thereof is not less than 50% and the internal haze thereof is not more than 10%. The present invention also relates to a method for preparing a one-side-roughened rolled plate-like body containing a converging pigment which comprises the steps of rolling a plate-like body formed from a resin composition which comprises a crystalline thermoplastic resin and a converging pigment in an amount ranging from 0.001 to 0.5 part by weight per 100 parts by weight of the resin at a temperature of not more than the melting point of the resin and a thickness reduction of not less than 40% to thus reduce the internal haze of the resin layer to a level of not more than 10% and surface-roughening one of the sides of the plate-like body simultaneously with or after the rolling treatment to adjust the overall haze of the body to not less than 50%.

DESCRIPTION OF THE PREFERRED EMBODIMENT

The plate-like body according to the present invention is one pigmented by the addition of a converging pigment and one of the sides thereof is roughened. Therefore, it is opaque to an extent that the overall haze thereof is at a level of the order of from 50 to 90%, but it is transparent to an extent that the internal haze thereof is substantially reduced to a level of from 0.5 to 10% by the rolling treatment. Therefore, the plate-like body can be locally made transparent only at any desired portion thereof by subjecting it to a treatment for making the roughened surface of the plate-like body smooth. Thus, concentrative light radiates through the edge portions of the region which is made transparent. In other words, the converging pigment sufficiently shows its effect and as a result, the plate-like body can thus cause the development of a clear and brilliant color.

The plate-like body according to the present invention is a rolled plate-like body pigmented by the addition of a converging pigment and the internal haze thereof is not more than 10%, preferably not more than 5% and more preferably not more than 2%. This is because if the internal haze is more than 12%, the scattering of the light incident upon the plate-like body is too great to achieve sufficient converging effect. As a result, the color of picture or pattern or figures and/or designs engraved on the transparent region, in particular the edge portion thereof, cannot be clearly realized.

As means for making the roughened surface smooth (or transparent), there may be mentioned, for instance, adhesion of a transparent tape to the roughened surface, coating of the roughened surface with a transparent solution or liquid or a transparent adhesive or stamping of the roughened surface with a mirror-finished face having a desired shape or pattern with the stamping with the mirror-finished face being preferred because of the clearness of the edge portion. The stamping with the mirror-finished face may be performed by rolling the plate-like body with a roughening roll partially carrying a mirror-finished face portion having a desired pattern to thus simultaneously perform rolling and stamping or by stamping after rolling.

It is further effective to subject the roughened surface to an activation treatment such as a corona discharge treatment and/or a chemical oxidation treatment in order to enhance the transparency of the plate-like body. Thus, the affinity of the surface to an adhesive or a liquid increases and as a result the adhesion thereof to the adhesive or the liquid is also improved.

PREPARATION OF PLATE-LIKE BODY

In the preparation of the plate-like body according to the present invention, the amount of the converging pigment to be added to a crystalline thermoplastic resin ranges from 0.001 to 0.5 part by weight, preferably 0.005 to 0.1 part by weight per 100 parts by weight of the crystalline thermoplastic resin. The converging pigment can directly be added to the raw resin, but if the amount of the converging pigment to be added is small, it is often observed that the pigment is insufficiently dispersed in the resin. To solve this problem, it is desirable to mix the converging pigment with a small amount of a powdery resin identical with the raw resin in advance to form a master batch and to then mix the master batch with the remaining raw resin with a blender such as a Henschel mixer, a tumbler or a ribbon blender to thus give a final compound.

In the present invention, there may optionally be added, to the plate-like body, heat stabilizers, weathering stabilizers, light stabilizers, antistatic agents, slip agents and/or nucleating agents, if necessary.

As methods for forming a compound of the raw resin and the converging pigment into a sheet-like substance after subjecting the compound to melt-extrusion, T-die molding methods or inflation molding methods commonly employed may be adopted with the use of the T-die molding method being preferred. This is because the T-die molding method has various advantages. For instance, it can achieve good uniformity in thickness and it can easily provide thick-walled articles.

In the state of a non-rolled sheet molded through melt extrusion, the converging pigment dispersed therein does not show its function, but it displays the function if the sheet is rolled and thus the sheet is clearly brilliant at the edge of the transparent region thereon.

The surface roughness of pressure rolls for producing a sheet having high transparency and a low internal haze is not more than 0.5 S, preferably not more than 0.2 S (as determined according to ISO-R488). Moreover, the gloss of the surface of the rolled plate-like body is preferably not less than 70% from the viewpoint of its commercial value.

ROLLING CONDITIONS

In the method of the present invention, the sheet molded through melt extrusion is subjected to the rolling treatment which plays a central role in the invention. The rolling treatment must be performed at a temperature of not more than the melting temperature of the resin used and in this case, the thickness reduction is in general set at a level of not less than 40%, preferably not less than 60% and more preferably not less than 70%. The term "melting point" used herein means the temperature at which the maximum peak of the DSC (differential scanning calorimetry) curve obtained according to ASTM-D3417 is present. The term "thickness reduction (r)" is herein defined as follows:

$$r = 100 \times (h_1 - h_2)/h_1 \quad (\%)$$

wherein $h_1$ is the thickness of the molded product prior to the rolling treatment and $h_2$ represents the thickness of the molded product after the rolling treatment.

If the thickness reduction is not more than 35%, not only the converging pigment cannot sufficiently show its function, in other words, the clear and brilliant color of the pigment cannot seen through the edge of the transparent region, but also a plate-like body having a sufficiently high tensile strength cannot be obtained. The control of the draft percentage can be performed by adjusting the rolling force applied to the rolling machine. In this case, if the temperature during the rolling treatment is near the upper limit of the desired temperature range, a high draft percentage can be attained by the application of a relatively low rolling force to the rolling machine. Alternatively, if the upper pressure roll is operated at a circumferential speed different from that for the lower pressure roll, the draft percentage can be increased even if numerically the same rolling force is applied to the rolling machine.

The final thickness of the plate-like body of the present invention in general ranges from 0.05 to 20 mm and preferably 0.1 to 10 mm.

The plate-like body of the present invention can be produced according to a variety of methods and, for instance, it may be produced in the following manners:

When a plate-like body as a raw material is rolled with a pair of rolls or caterpillars which rotate in the directions opposite to one another, the material is rolled through a pair of rolls or caterpillars one of which has a mirror-finished surface and the other of which has a matte-finished surface to thus simultaneously perform rolling and surface-roughening treatments;

A plate-like body as a raw material is rolled through a pair of rolls or caterpillars which rotate in directions opposite to one another to form a transparent plate-like body and then one of the sides thereof is surface-roughened by subjecting it to at least one treatment selected from the group consisting of those listed below:

a thermal treatment which comprises instantaneously contacting, on the surface of the plate-like body, a hot gas having a temperature of not less than the melting point of the resin;

a chemical treatment which comprises contacting the surface of the plate-like body with a chemical substance which can dissolve or swell the resin as the raw material therefor;

a mechanical treatment which comprises scratching the surface of the plate-like body by a roll such as a brush roll and a file roll; or scratching the surface by spraying sand or fine metal particles on the surface in the form of a fluid (shot blasting);

clamping in a one-side roughened press;

transfer by pressing the surface through a surface-roughened hard material; and transfer by passing the surface through a pair of mirror-finished/matte-finished surface type rolls or caterpillars which rotate in directions opposite to one another.

SURFACE-ROUGHENING TREATMENT OF THE PLATE-LIKE BODY

In order to subject the surface of the plate-like body of the present invention to a surface roughening treatment, the mechanical treatments are most practicable among others. In particular, the plate-like body to be processed is rolled and spreaded through rolls or pressure plates which are subjected to shot blasting with fine sand or fine metal particles of 50 to 1,000 mesh and preferably 100 to 600 mesh.

CONVERGING PIGMENTS

The term "converging pigment" as used herein means pigments which can absorb light incident upon the surface of the rolled plate-like body when they are incorporated into the rolled plate-like body and can convert the light absorbed into fluorescence rays and thus emit the same. Most parts of the fluorescent light rays generated by the converging pigment within the plate-like body are guided towards the edge portions of the plate-like body in accordance with the rule of the total reflection, the fluorescence rays thus concentrated radiate outside the body through the edge to thus clearly realize the color of the pigment.

Examples of such converging pigments include dyes or pigments such as perylene compounds, for instance, derivatives of perylene-3,9-dicarboxylic acid and perylenetetracarboxylic acid diimide compounds; anthraquinone compounds, for instance, pyranthrones, acridones, flavanthrones, benzanthrones, anzanthrones, indanthrones and dibenzpyrenequinones; and thioindigo and thioindigo derivatives which have methyl groups and/or halogen atoms as substituents.

RESINS AS RAW MATERIALS

The crystalline thermoplastic resins which may be used in the present invention are, for instance, those listed below:

crystalline polyolefin resins such as polypropylene (hereunder referred to as "PP"), high density polyethylene (hereunder referred to as "HDPE"), medium density polyethylene (hereunder referred to as "MDPE"), linear low density polyethylene (hereunder referred to as "L-LDPE"), ethylene-propylene copolymers, poly-1-butene and poly-4-methyl-1-pentene; polyamide resins, for instance, nylon-6, nylon-6,6, nylon-6,10, nylon-11 and nylon-12; polyester resins, for instance, polyethylene terephthalate resin and polybutylene terephthalate.

Among these crystalline thermoplastic resins, preferred are crystalline polyolefin resins because of their excellent transparency and good moldability.

In the foregoing crystalline polyolefin resins, the term "crystalline" means that the polyolefin resin has the amount of the residue, obtained after extraction with boiling heptane, of not less than 70% by weight and preferably not less than 80% by weight on the basis of the total weight of the resin.

EXAMPLES

The present invention will hereunder be explained in more detail with reference to the following working Examples and Comparative Examples, but the present invention is by no means limited to these specific Examples.

Measurement Conditions:
Haze: ASTM-D1008
Strength: ASTM-D882

EXAMPLES 1 TO 4 AND COMPARATIVE EXAMPLES 1 AND 2

100 parts by weight of a propylene homopolymer (PP) MFR (230° C.; 2.16 kg)=0.7 g/10 min ) was mixed with one part by weight of a mixed powder of a converging pigment (a perylene yellow converging pigment) which had been diluted 100 times with the foregoing PP powder, the resulting compound was melt-extruded at a resin temperature of 250° C. through a T die (width of the tip thereof=400 mm; lip clearance=1.9 mm) and then formed into a sheet (thickness 1.5 mm ×width 340 mm) by treating it with a pair of chill rolls maintained at 60° C. to give a sheet. This sheet was slitted at its central portion at a width of 100 mm to give a raw sheet for rolling (thickness 1.5 mm×width 100 mm; hereunder referred to as simply "raw sheet").

The resulting raw sheet was rolled in the following manner using a pair of pressure rolls (diameter 120 mm×width 130 mm) at a roll surface temperature of 120° C. to give a rolled sheet. The pressure rolls and the conditions for the rolling were as follows:

One of the paired pressure rolls had a mirror-finished surface having a surface roughness of 0.2 S and the other roll had a matte-finished surface obtained by subjecting the surface to 200 mesh shot blasting. The raw sheet was rolled under a rolling force of 3, 4, 6 or 8 tonf using the paired rolls. The haze, strength or the like of the resulting 4 kinds of rolled sheets were determined. The results thus obtained are summarized in the following Table 1.

On the other hand, in Comparative Example 1, the same compound used in Example 1 was melt-extruded through a T-die whose clearance had been adjusted to 0.8 mm to give a sheet (sheet thickness 0.5 mm×width 340 mm), the resulting sheet was slitted at its central portion at a width of 100 mm to give a non-rolled raw sheet (thickness 0.5 mm ×width 100 mm).

Further, in Comparative Example 2, the same procedures used in Example 1 were repeated except that the rolling force was changed to 0.5 tonf to give a rolled sheet. Various properties of the rolled sheets obtained in Examples 1 to 4 and Comparative Examples 2 and the non-rolled sheet obtained in Comparative Example 1 were determined and the results obtained were listed in the following Table 1.

As will be seen from the results listed in Table 1, the following conclusions can be drawn from these results:

The haze is reduced to 1/10 that of the raw sheet by rolling under a rolling force of 3 tonf (49.9%>4.9%).

If the rolling force is increased from 3 tonf to 8 tonf, the sheets are further improved in the following points in addition to the foregoing improvement in haze:

the internal haze of the rolled sheet is substantially reduced to 1/7 that of the raw sheet.

the strength of the rolled sheet is increased to at least two times that of the raw sheet.

the thickness of the rolled sheet is reduced to ½ time that of the raw sheet.

EXAMPLE 5

According to the same procedures used in Example 1, a raw sheet (thickness 1.5 mm ×width 100 mm) was produced except that 0.4 part by weight of a converging pigment was mixed with 100 parts by weight of a PP (MFR=0.7 g/10 min). A rolled sheet was produced by rolling the resulting raw sheet using the same pressure rolls and rolling temperature used in Example 1 under a rolling force of 4 tonf. Properties of the resulting rolled sheet were determined and the results obtained were summarized in Table 1.

EXAMPLE 6

According to the same procedures used in Example 1, a raw sheet (thickness 1.5 mm × width 100 mm) was produced except that 5 parts by weight of a mixed powder of a converging pigment (1 part by weight of the converging pigment was diluted 1000 times with the following PP powder) was mixed with 100 parts by weight of PP (MFR=0.7 g/10 min). A rolled sheet was produced by rolling the resulting raw sheet using the same pressure rolls and rolling temperature used in Example 1 under a rolling force of 4 tonf. Properties of the resulting rolled sheet were determined and the results obtained were summarized in Table 1.

COMPARATIVE EXAMPLE 3

According to the same procedures used in Example 1, a raw sheet (thickness 1.5 mm × width 100 mm) was produced except that 0.5 part by weight of a mixed powder of a converging pigment (1 part by weight of the converging pigment was diluted 1000 times with the following PP powder) was mixed with 100 parts by weight of PP (MFR=0.7 g/10 min)

A rolled sheet was produced by rolling the resulting raw sheet using the same pressure rolls and rolling temperature used in Example 1 under a rolling force of 5 tonf. Properties of the resulting rolled sheet were determined and the results obtained were summarized in Table 1.

EXAMPLES 7 TO 9 AND COMPARATIVE EXAMPLE 4

According to the same procedures used in Example 1, a raw sheet (thickness 0.5 mm × width 100 mm) was produced except that a composition obtained by mixing 1 part by weight of a mixed powder Of a converging pigment (the converging pigment (a perylene yellow converging pigment) was diluted 100 times with the following HDPE powder) with 100 parts by weight of a high density polyethylene (HDPE) ( MI (190° C., 2.16 kgf)=0.4 g/10 min) .

The resulting raw sheet was rolled with a pair of rolls similar to those used in Example 1. The rolling was performed at a roll surface temperature of 85° C., a rolling force of 4, 6 and 8 tonf to give three kinds of rolled sheets. On the other hand, in Comparative Example 4, the same compound as example 7 was melt-extruded through a T-die whose clearance was adjusted to 0.8 mm to give a sheet (thickness 0.5 mm × width 340 mm).

The resulting sheet was slitted at its central portion to give a non-rolled sheet of 0.5 mm thick × 100 mm wide. Various properties of the resulting rolled sheets obtained in Examples 7 to 9 and the non-rolled sheet obtained in Comparative Example 4 were determined and the results thus obtained were likewise listed in the following Table 1.

EXAMPLES 10 AND 11 AND COMPARATIVE EXAMPLE 5

According to the same procedures used in Example 8, two kinds of raw sheets (thickness 1.5 mm × width 100 mm) were produced except that a composition obtained by mixing 0.1 part by weight (in Example 10) and 0.05 part by weight (in Example 11) of a mixed powder of a converging pigment (the converging pigment (a perylene yellow converging pigment) was diluted 100 times with the following HDPE powder) with 100 part by weight of a high density polyethylene (HDPE) ( MI (190° C., 2.16 kgf)=0.4 g/10 min) .

The resulting two kinds of raw sheets were rolled with a pair of rolls similar to those used in Example 1. The rolling was performed at a roll surface temperature of 85° C., a rolling force of 6 tonf to give two kinds of rolled sheets. On the other hand, in Comparative Example 5, the same compound used in Example 11 was melt-extruded through a T-die whose clearance was adjusted to 0.8 mm to give a non-rolled sheet (thickness 0.5 mm × width 100 mm). Various properties of the resulting rolled sheets obtained in Examples 10 and 11 and the non-rolled sheet obtained in Comparative Example 5 were determined and the results thus obtained were likewise listed in the following Table 1.

EXAMPLES 12 AND 13 AND COMPARATIVE EXAMPLE 6

A composition obtained by mixing 100 parts by weight of a commercially available polyamide resin ( trade name: Amilan CM 1021 (available from Toray Industries Inc.) with 0.1 part by weight of a converging pigment (a perylene yellow converging pigment) was formed into a sheet (thickness 0.5 mm × width 320 mm) using the same extruder used in Example 1. The molding of the sheet was performed by melt-extruding the foregoing compound through a T-die (width=400 mm; lip clearance=0.8 mm) of the extruder maintained at 260° C. and then passing it through a pair of chill rolls maintained at a temperature of 60° C. to give a sheet (thickness 0.5 mm × width 320 mm). The sheet was slitted in the same manner used in Example 1 to give a raw sheet (thickness 0.5 mm × width 100 mm).

The resulting raw sheet was rolled with a pair of rolls similar to those used in Example 1 except that the rolling temperature was changed to 160° C., at a rolling force of 6 tonf or 7 tonf to give two kinds of rolled sheets. On the other hand, in Comparative Example 6, a raw sheet was produced according to Example 12. Various properties of the resulting rolled sheets obtained in Examples 12 and 13 and the raw sheet obtained in Comparative Example 6 were determined and the results thus obtained were likewise listed in the following Table 1.

The surface-roughened rolled plate-like body containing a converging pigment according to the present invention is as a whole opaque, but since the internal haze thereof is reduced to a very low level by a rolling treatment (or it is made transparent to a substantial extent), upon using the same, only a desired portion thereof can be made transparent and the plate-like body thus makes it possible to display, at the edge of the transparent portion, the clear and brilliant color of the converging pigment incorporated into the body. Thus, the plate-like body of the present invention is useful in wide variety of fields such as containers, packaging materials and character goods.

TABLE 1

| Experiment No. | Raw Rasin | Coloring Agent Added Amount* | Raw Sheet Thickness (mm) | Rolling Force (tonf) | Thickness Reduction (%) | Rolled Product Thickness (mm) | Strength (Kgf/mm$^2$) | Haze (%) Overall | Haze (%) Internal | Converging Effect | Realization of Transparency |
|---|---|---|---|---|---|---|---|---|---|---|---|
| Example | | | | | | | | | | | |
| 1 | PP | 0.01 | 1.50 | 3 | 47.5 | 0.787 | 11.6 | 75.5 | 4.9 | ○ | ○ |
| 2 | PP | 0.01 | 1.50 | 4 | 56.5 | 0.652 | 14.8 | 73.3 | 3.6 | ○ | ○ |
| 3 | PP | 0.01 | 1.50 | 6 | 68.7 | 0.469 | 19.3 | 66.1 | 2.2 | ○ | ○ |
| 4 | PP | 0.01 | 1.50 | 8 | 73.4 | 0.400 | 24.8 | 60.2 | 0.7 | ○ | ○ |
| 5 | PP | 0.4 | 1.50 | 4 | 56.2 | 0.657 | 14.9 | 74.5 | 3.8 | ○ | ○ |
| 6 | PP | 0.005 | 1.50 | 4 | 56.4 | 0.654 | 14.8 | 72.8 | 3.5 | ○ | ○ |
| Comp. Example | | | | | | | | | | | |
| 1 | PP | 0.01 | 0.500 | — | — | Non-rolled | 3.3 | 52.0 | 49.9 | x x | x |
| 2 | PP | 0.01 | 1.50 | 0.5 | 10.3 | 1.35 | 10.1 | 78.6 | 51.1 | x | x |
| 3 | PP | 0.0005 | 1.50 | 5 | 65.4 | 0.519 | 17.8 | 66.4 | 2.5 | x | ○ |
| Example | | | | | | | | | | | |
| 7 | HDPE | 0.01 | 1.50 | 4 | 58.4 | 0.624 | 12.2 | 73.1 | 3.8 | ○ | ○ |
| 8 | HDPE | 0.01 | 1.50 | 6 | 71.1 | 0.433 | 17.5 | 66.5 | 2.6 | ○ | ○ |
| 9 | HDPE | 0.01 | 1.50 | 8 | 75.7 | 0.364 | 22.9 | 61.3 | 1.8 | ○ | ○ |
| 10 | HDPE | 0.1 | 1.50 | 6 | 70.9 | 0.436 | 17.4 | 67.1 | 2.9 | ○ | ○ |
| 11 | HDPE | 0.005 | 1.50 | 6 | 71.3 | 0.434 | 17.7 | 66.2 | 2.5 | ○ | ○ |
| Comp. Example 4 | HDPE | 0.01 | 0.500 | — | — | Non-rolled | 2.8 | 61.7 | 58.5 | x x | x |
| Example | | | | | | | | | | | |
| 12 | Nylon | 0.1 | 0.500 | 5 | 65.2 | 0.174 | 23.8 | 68.8 | 4.0 | ○ | ○ |
| 13 | Nylon | 0.1 | 0.500 | 7 | 70.8 | 0.146 | 30.1 | 65.3 | 2.6 | ○ | ○ |
| Comp. Example 5 | Nylon | 0.1 | 0.500 | — | — | Non-rolled | 4.6 | 58.8 | 54.6 | x x | x |

Notes in Table 1
*parts by weight per 100 parts by weight of the resin as a raw material.
Converging Effect: a mirror-finished face (surface roughness = 0.2 S; a size of 20 mm × 40 mm) was transferred to the roughened surface of a sheet by stamping method.
○: clear brilliant color is observed at the edge of the transparent region.
x: pale and dim color is observed at the edge of the transparent region.
x x: the transparent region becomes turbid and dim color is observed at the edge.
Realization of Transparency:
This was evaluated by examining whether the letters (height 2 cm × width 3 cm) on a calender suspended on the wall can be seen at a position 3 m apart from the wall through the transparent region or not.
○: the letters can be read clearly.
x: the letters cannot be read at all.

We claim:

1. A one-side-roughened rolled plate-shaped body containing a converging pigment which comprises a plate-shaped body formed from a resin composition comprising a crystalline thermoplastic resin and a converging pigment in an amount ranging from 0.001 to 0.5 part by weight per 100 parts by weight of the resin, wherein one of the sides of the plate-shaped body is smooth and the other side thereof is roughened and wherein the overall haze thereof is not less than 50% and the internal haze thereof is not more than 10%.

2. The one-side-roughened rolled plate-shaped body as set forth in claim 1 wherein the crystalline thermoplastic resin is a crystalline polyolefin.

3. The one-side-roughened rolled plate-shaped body as set forth in claim 1 wherein the crystalline thermoplastic resin is a crystalline polyamide.

4. The one-side-roughened rolled plate-shaped body as set forth in claim 2 wherein the crystalline polyolefin resin is a resin selected from the group consisting of crystalline homopolymers of propylene, crystalline copolymers of propylene and mixtures of the aforementioned resins.

5. The one-side-roughened rolled plate-shaped body as set forth in claim 2 wherein the crystalline thermoplastic resin is a crystalline copolymer of propylene and ethylene.

6. The one-side-roughened rolled plate-shaped body as set forth in claim 1 wherein the converging pigment is a perylene pigment.

7. The one-side-roughened rolled plate-shaped body as set forth in claim 1 wherein the converging pigment is a perylenequinone pigment.

8. A method for preparing a one-side roughened rolled plate-shaped body containing a converging pigment comprising the steps of rolling a plate-shaped body formed from a resin composition which comprises a crystalline thermoplastic resin and a converging pigment in an amount ranging from 0.001 to 0.5 part by weight per 100 parts by weight of the resin at a temperature of not more than the melting point of the resin and a thickness reduction of not less than 40% to reduce the internal haze of the resin layer to not more than 10% and surface-roughening one of the sides of the plate-shaped body simultaneously with or after the rolling treatment to adjust the overall haze of the body to not less than 50%.

9. The method for preparing a one-side roughened rolled plate-shaped body containing a converging pigment as set forth in claim 8 wherein the rolling is carried out at a thickness reduction of not less than 60%.

10. The method for preparing a one-side roughened rolled plate-shaped body containing a converging pigment as set forth in claim 8 wherein the rolling is carried out at a thickness reduction of not less than 70%.

11. The method for preparing a one-side roughened rolled plate-shaped body containing a converging pigment as set forth in claim 8 wherein said one side is surface-roughened by a thermal treatment comprising contacting said one-side with a hot gas having a temperature of not less than the melting point of said resin.

12. The method for preparing a one-side roughened rolled plate-shaped body containing a converging pigment as set forth in claim 8 wherein said one side is surface-roughened by a chemical treatment which comprises contacting said one side with a substance which dissolves or swells said resin.

13. The method for preparing a one-side roughened rolled plate-shaped body containing a converging pigment as set forth in claim 8 wherein said one side is surface roughened by a mechanical process comprising shot blasting with a fluid.

14. The method for preparing a one-side roughened rolled plate-shaped body containing a converging pigment as set forth in claim 13 wherein said fluid includes sand.

15. The method for preparing a one-side roughened rolled plate-shaped body containing a converging pigment as set forth in claim 13 wherein said fluid includes fine metal particles.

16. The method for preparing a one-side roughened rolled plate-shaped body containing a converging pigment as set forth in claim 8 wherein said one side is surface roughened by contacting said one surface with a brush roll and a file roll.

17. The method for preparing a one-side roughened rolled plate-shaped body containing a converging pigment as set forth in claim 8 wherein said one side is surface roughened by clamping said plate-shaped body in a one-side roughened press.

18. The method for preparing a one-side roughened rolled plate-shaped body containing a converging pigment as set forth in claim 8 wherein said one side is roughened by passing said plate-shaped body through a press having a surface-roughened hard material.

19. The method for preparing a one-side roughened rolled plate-shaped body containing a converging pigment as set forth in claim 8 wherein said one side is roughened by passing said plate-shaped body through a pair of surface type rolls or caterpillars which rotate in opposite directions, one of which has a mirror finish and the other of which has a matte finish.

* * * * *

UNITED STATES PATENT AND TRADEMARK OFFICE
CERTIFICATE OF CORRECTION

PATENT NO. : 5,219,627
DATED : JUNE 15, 1993
INVENTOR(S) : ARASE ET AL.

It is certified that error appears in the above-indentified patent and that said Letters Patent is hereby corrected as shown below:

Claim 5, col. 9, lines 63-64, change "thermoplastic" to --polyolefin--.

Signed and Sealed this

Third Day of May, 1994

Attest:

BRUCE LEHMAN

Attesting Officer

Commissioner of Patents and Trademarks